(12) United States Patent
Leigh et al.

(10) Patent No.: US 10,498,451 B2
(45) Date of Patent: Dec. 3, 2019

(54) REMOVABLE MODULE (71) Applicant: HEWLETT PACKARD ENTERPRISE DEVELOPMENT LP, Houston, TX (US)

(72) Inventors: Kevin B Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/765,018

(22) PCT Filed: Oct. 1, 2015

(86) PCT No.: PCT/US2015/053528
§ 371 (c)(1),
(2) Date: Mar. 30, 2018

(87) PCT Pub. No.: WO2017/058232
PCT Pub. Date: Apr. 6, 2017

(65) Prior Publication Data
US 2018/0278332 A1 Sep. 27, 2018

(51) Int. Cl.
*H04B 10/40* (2013.01)
*H04B 10/25* (2013.01)
(Continued)

(52) U.S. Cl.
CPC ............. *H04B 10/40* (2013.01); *G02B 6/428* (2013.01); *G02B 6/4261* (2013.01);
(Continued)

(58) Field of Classification Search
CPC .... G02B 6/4261; G02B 6/4268; G02B 6/428; G02B 6/4284; G02B 6/4292; H04Q 11/00; H04B 10/40; H04B 10/801; H04B 10/25
(Continued)

(56) References Cited

U.S. PATENT DOCUMENTS 5,854,904 A * 12/1998 Brown ................... G06F 1/1632
710/100
7,010,232 B1 * 3/2006 Ott ....................... H04B 10/801
398/154

(Continued)

OTHER PUBLICATIONS

International Search Report and Written Opinion, International Application No. PCT/US2015/053528, date Sep. 8, 2016, pp. 1-10, KIPO.

*Primary Examiner* — Oommen Jacob
(74) *Attorney, Agent, or Firm* — Dicke, Billig & Czaja, PLLC (57) ABSTRACT

One example of a removable module includes an optical transceiver, optical cables, electrical cables, a power conditioner, and a housing. The optical transceiver converts optical signals received through an optical cable to electrical signals to distribute to a plurality of computing devices through electrical cables and converts electrical signals received from the plurality of computing devices through the electrical cables to optical signals to transmit through the optical cable. The power conditioner receives power from a system with the removable module installed in the system to provide power to the optical transceiver. The housing encloses the optical transceiver and the power conditioner and includes an air intake port and an air exhaust vent. The housing is received by a bay of the system, which provides an interface to the power conditioner and provides air to the air intake port with the removable module installed in the system.

15 Claims, 4 Drawing Sheets

(51) Int. Cl.
*H04Q 11/00* (2006.01)
*G02B 6/42* (2006.01)
*H04B 10/80* (2013.01)

(52) U.S. Cl.
CPC ........... *G02B 6/4268* (2013.01); *H04B 10/25* (2013.01); *H04B 10/801* (2013.01); *H04Q 11/00* (2013.01); *G02B 6/4284* (2013.01); *G02B 6/4292* (2013.01); *H04Q 2213/13098* (2013.01)

(58) Field of Classification Search
USPC .................................................. 398/115–117
See application file for complete search history.

(56) References Cited

U.S. PATENT DOCUMENTS

| | | | | |
|---|---|---|---|---|
| 7,260,423 | B2* | 8/2007 | Richardson | H04B 1/3816 455/41.1 |
| 7,505,688 | B2 | 3/2009 | Guenter et al. | |
| 8,358,504 | B2* | 1/2013 | McColloch | G02B 6/4269 361/679.46 |
| 8,358,934 | B2* | 1/2013 | Hinderthuer | H04Q 11/0005 398/113 |
| 8,498,309 | B2* | 7/2013 | Campini | H04Q 1/03 361/725 |
| 9,042,096 | B2* | 5/2015 | Thomas | H04L 1/00 361/688 |
| 9,124,025 | B2* | 9/2015 | Xue | G02B 6/4261 |
| 9,291,782 | B2* | 3/2016 | Skepnek | G02B 6/4201 |
| 9,484,678 | B1* | 11/2016 | Briant | H01R 13/659 |
| 9,582,450 | B2* | 2/2017 | Luck | G06F 1/181 |
| 9,653,829 | B2* | 5/2017 | Long | H01R 12/716 |
| 9,918,401 | B2* | 3/2018 | Leigh | H05K 7/1492 |
| 2004/0099747 | A1* | 5/2004 | Johnson | H05K 7/20736 236/49.3 |
| 2005/0170770 | A1* | 8/2005 | Johnson | H05K 7/20836 454/184 |
| 2008/0106881 | A1 | 5/2008 | Tari et al. | |
| 2008/0186667 | A1* | 8/2008 | Verdiell | H05K 7/1492 361/679.4 |
| 2009/0135558 | A1* | 5/2009 | Hughes | H05K 7/20727 361/679.46 |
| 2010/0284698 | A1 | 11/2010 | McColloch | |
| 2012/0020012 | A1* | 1/2012 | Chang | H05K 7/1489 361/679.46 |
| 2012/0081856 | A1* | 4/2012 | Hopkins | G06F 1/187 361/679.33 |
| 2012/0134678 | A1* | 5/2012 | Roesner | G06F 13/14 398/115 |
| 2012/0279233 | A1* | 11/2012 | Chainer | H05K 7/20781 62/3.6 |
| 2013/0249479 | A1* | 9/2013 | Partovi | H02J 7/025 320/108 |
| 2013/0282944 | A1* | 10/2013 | Shaw | G06F 13/4022 710/305 |
| 2014/0056592 | A1* | 2/2014 | McColloch | H04B 10/40 398/135 |
| 2014/0328562 | A1* | 11/2014 | Pitwon | G02B 6/4293 385/89 |
| 2015/0078740 | A1* | 3/2015 | Sipes, Jr. | H04B 10/808 398/16 |
| 2015/0181316 | A1 | 6/2015 | Patel et al. | |
| 2015/0237749 | A1* | 8/2015 | Boetzer | H05K 5/0221 403/322.4 |
| 2015/0253794 | A1* | 9/2015 | Palmer | H05K 7/1498 700/297 |
| 2015/0366095 | A1* | 12/2015 | Junkins | H05K 5/0256 361/679.31 |
| 2016/0057838 | A1* | 2/2016 | Maros | H05B 37/0272 315/291 |
| 2016/0095246 | A1* | 3/2016 | Noland | H05K 7/1489 361/679.31 |
| 2018/0278332 | A1* | 9/2018 | Leigh | H04B 10/25 |
| 2018/0309519 | A1* | 10/2018 | Yuda | H04B 1/036 |
| 2019/0018208 | A1* | 1/2019 | Zbinden | G02B 6/4268 |

* cited by examiner

REMOVABLE MODULE

BACKGROUND

Electrical devices, such as computing devices, may be electrically connected to each other, or be in electrical communication, such that one computing device can send an electrical signal, and another computing device can receive the sent electrical signal. Electrical signals may be transmitted from one computing device to another computing device through an electrical cable. The electrical cable may have an electrical connector on each end of the cable to connect to the transmitting and the receiving computing devices. Further, electrical devices such as computing devices may communicate with other electrical devices using optical communication. A computing device may transmit an optical signal to another computing device, which may receive the optical signal.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Electrical devices may electrically communicate with other electrical devices. In some situations, electrical devices may electrically communicate with multiple other electrical devices, and, sometimes, a large number of other electrical devices. Electrical devices may electrically communicate with other electrical devices through electrical cables. Each electrical cable may engage with an electrical communication port of a first electrical device on one end of the cable and with a second electrical communication port of a second electrical device on the other end of the cable.

Electrical devices may use electrical cables to electrically communicate with one or more other electrical devices that may be relatively far from the first electrical device. In such situations, the electrical cables that are used may be of a larger gauge or diameter than would be used if the electrical devices were closer together. This larger gauge of wire may increase the portion of the volume within a system that is occupied by the electrical cables. Further, signal conditioning circuitry, such as signal repeaters, may be used to maintain signal integrity across the increased length of the electrical connection between the electrical devices, thus also increasing the occupied volume and power consumption of the system.

Electrical devices may optically communicate with other electrical devices. Electrical devices may maintain optical communication by one electrical device transmitting an optical signal through the optical fibers of an optical cable, and another electrical device receiving the optical signal, and vice versa. In some situations, an electrical device may optically communicate with multiple other electrical devices by using multiple optical cables. An electrical device may also optically communicate with multiple other electrical devices by using a single optical cable containing a sufficient number of optical fibers to carry multiple optical signals to the multiple other electrical devices. In one example, such an optical cable may be referred to as an optical trunk cable.

Some electrical devices may be in electrical communication with other electrical devices through the use of optical signal communication. An electrical device may have a transceiver to convert an electrical signal into an optical signal, and vice versa. The optical signal may then be sent through an optical cable to a receiving electrical device. The receiving electrical device may have another transceiver to convert the transmitted optical signal back into the electrical signal to complete the electrical communication with the transmitting electrical device.

A first electrical device may electrically communicate with multiple second electrical devices. The multiple second electrical devices may be disposed in a rack, which may be located relatively far away from the first electrical device. It may also be desirable to have the first electrical device electrically communicate with multiple second electrical devices that are disposed in different racks, with each rack in a different location. Using an electrical cable from the first electrical device to connect with each of the second electrical devices may occupy a large volume within the overall system. In addition, the increased diameter of each electrical cable due to the relatively far distance between the first and second electrical devices, as well as the inclusion of any signal conditioning circuitry, may further increase the occupied volume by the cabling within the overall system, as well as increase the cost of such cabling.

Using an optical cable from the first electrical device to connect with each of the second electrical devices may also, similar to electrical cabling, increase the occupied volume by optical cabling within the system. This increased number of optical cables also increases the cost of the cabling. In addition, the first electrical device may not have enough optical connectors due to a lack of faceplate real estate and/or cost to use a dedicated optical cable for each of the second electrical devices. As described above, an optical trunk cable may be used to enable optical communication between the first electrical device and multiple second electrical devices, using a high-density optical connector on the first electrical device. The desired electrical signals may be converted into optical signals within the first electrical device; however, the optical signals then need to be converted back to electrical signals for each of the second electrical devices. Optical fibers within an optical trunk cable may be split off into multiple optical cables. Each of the split optical cables may couple to an optical transceiver of an electrical device, which may be more expensive than using a single, larger optical transceiver.

A pass-through module may be disposed in each rack of second electrical devices and have one or more transceivers, powered by a local power source, to convert the optical signals from the first electrical device back into electrical signals, receivable by each of the second electrical devices disposed in that rack. The electrical signals may be transmitted from the pass-through module in each rack to the second electrical devices in that rack by electrical cables. A pass-through module may include one or more media-converter modules or multi-channel media converter modules, one or multiple optical transceivers, management logic, cooling fans, a local power supply and a power cord to connect to a power source in a rack.

If the pass-through module were to experience a failure or a malfunction, however, each of the second electrical devices engaged with the pass-through module would no longer be in electrical communication with the first electrical device. Further, the pass-through module may occupy a large volume within a rack of second electrical devices. This occupied volume may otherwise be used to increase the number of second electrical devices, or, in other words, increase the density of the rack of second electrical devices.

The number of second electrical devices within a rack may vary from rack to rack. Thus, a pass-through module may not, in some racks, have the right number of electrical connectors to transmit the converted electrical signals to each of the second electrical devices disposed within that particular rack. Also, since there is one pass-through module per rack, relatively long electrical cables may be used to connect the pass-through module with each of the second electrical devices disposed within the rack.

Accordingly, examples of the present disclosure provide removable optical transceiver modules that may replace pass-through modules within a system, while still transmitting optical signals from a first electrical device to one or more second electrical devices, and performing media conversion between electrical and optical signals. Examples of the present disclosure may free volume within the system that may be used by additional electrical devices. Further, examples of the present disclosure provide removable transceiver modules that may communicatively couple the first electrical device with one or more second electrical devices while minimizing the length of electrical cables used, thereby reducing the gauge or diameter of such cabling, and removing additional signal conditioning circuitry. This may free additional volume within the second electrical devices and lower the cost of the second electrical devices.

In addition, multiple removable transceiver modules may be used to communicatively couple the second electrical devices to the first electrical device, thereby allowing the number of second electrical devices disposed in a rack to be changed or adjusted, and avoid a situation where every second electrical device within a system is connected to the first electrical device through a single pass-through module. This may avoid a single point of failure within the system, such that only a portion of the second electrical devices within the system will cease to communicate with the first electrical device, should one of the removable transceiver modules experience a failure or a malfunction.

Figure 1:
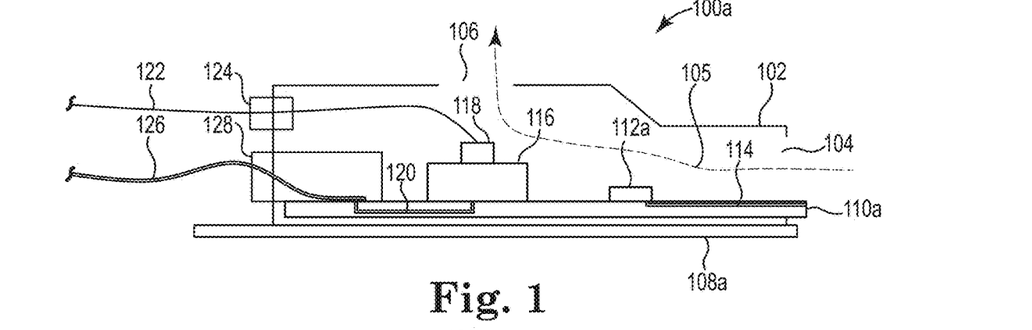
FIG. 1 illustrates one example of a removable module.

FIG. 1 illustrates one example of a removable module 100a. Removable module 100a includes a housing 102, an alignment mechanism 108a, a printed circuit board (PCB) 110a, a power conditioner 112a, an optical transceiver 116, an optical connector 118, an optical cable 122, an optical cable strain reliever 124, an electrical cable 126, and an electrical cable strain reliever 128. Housing 102 is mechanically coupled to alignment mechanism 108a and encloses PCB 110a, power conditioner 112a, optical transceiver 116, and optical connector 118.

Housing 102 includes an air intake port 104 and an air exhaust vent 106. In one example, air intake port 104 is arranged in a side wall of housing 102, and air exhaust vent 106 is arranged in the top wall of housing 102 above optical transceiver 116. Housing 102 may be received by a bay of a system when removable module 100a is installed in a system. Alignment mechanism 108a may be received by a bay to align removable module 100a in a system. Once installed in a system, the system supplies cool air to air intake port 104 for cooling removable module 100a, and heated air is exhausted through air exhaust vent 106 as indicated by air flow path 105. The system also supplies power to removable module 100a as described below.

Power conditioner 112a is electrically coupled to PCB 110a. PCB 110a includes electrical traces 114 to electrically couple power conditioner 112a to a power source interface of a bay of a system when removable module 100a is installed in a system. In one example, electrical traces 114 provide a board edge connection to the power source interface of a bay of a system. Power conditioner 112a converts and/or conditions power received from a system and provides power for operating optical transceiver 116 when removable module 100a is installed in a system.

Optical transceiver 116 is electrically coupled to PCB 110a. PCB 110a includes electrical traces (not shown) to electrically couple optical transceiver 116 to power conditioner 112a, and electrical traces 120 to electrically couple optical transceiver 116 to electrical cable 126. Optical connector 118 optically couples optical transceiver 116 to optical cable 122. Optical cable 122 includes a plurality of optical fibers for transmitting/receiving a plurality of optical signals. In one example, optical cable 122 is an optical trunk cable to optically couple removable module 100a to an electrical device (e.g., a switch device). In this example, optical cable 122 is fixedly attached to removable module 100a and extends from inside housing 102 to outside housing 102. Optical cable 122 extends through optical cable strain reliever 124 to prevent strain on the optical connection between optical cable 122 and optical connector 118.

Electrical cable 126 includes a plurality of electrical signal wires for transmitting/receiving a plurality of electrical signals. In one example, electrical cable 126 is a breakout cable for electrically coupling removable module 100a to a plurality of electrical devices (e.g., computing devices). In this example, electrical cable 126 is fixedly attached to PCB 110a and extends from inside housing 102 to outside housing 102. Electrical cable 126 extends through electrical cable strain reliever 128 to prevent strain on the electrical connections between electrical cable 126 and PCB 110a. In another example, removable module 100a may include multiple electrical cables 126, where each of the electrical cables 126 electrically couples removable module 100a to a corresponding computing device.

In operation, optical transceiver 116 receives optical signals through optical cable 122 from a switch device (e.g., a network switch) and converts the optical signals to electrical signals. The electrical signals are then distributed to a plurality of computing devices (e.g., servers) through electrical cable 126. Optical transceiver 116 also receives electrical signals from the plurality of computing devices through electrical cable 126 and converts the electrical signals to optical signals. The optical signals are then transmitted through optical cable 122 to the switch device.

Figure 2:
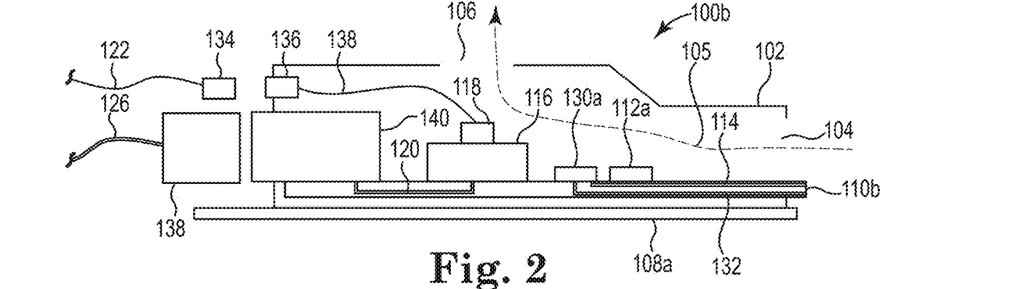
FIG. 2 illustrates another example of a removable module.

FIG. 2 illustrates another example of a removable module 100b. Removable module 100b is similar to removable module 100a previously described and illustrated with reference to FIG. 1, except that removable module 100b includes a PCB 110b, a management controller 130a, optical cable connectors 134 and 136, optical jumper 138, and electrical connectors 138 and 140.

Management controller 130a is electrically coupled to PCB 110b. PCB 110b includes electrical traces 132 to electrically couple management controller 130a to a management controller interface of a bay of a system when removable module 100b is installed in a system. In one example, electrical traces 132 provide a board edge connection to the management controller interface of a bay of a system. Management controller 130a may be used to configure, control, and/or monitor optical transceiver 116 and to communicate management signals (e.g., configuration information, status information) between removable module 100b and a system when removable module 100b is installed in a system.

Optical connector 134 is optically coupled to optical cable 122. Optical connector 136 is mechanically coupled to housing 102 and optically coupled to optical jumper 138. Optical jumper 138 optically couples optical connector 136 to optical connector 118. Optical connector 136 may receive an optical connector 134 (illustrated as disconnected in FIG. 2) to optically couple optical cable 122 to optical transceiver 116.

Electrical connector 138 is electrically coupled to electrical cable 126. Electrical connector 140 is mechanically coupled to housing 102 and electrically coupled to PCB 110b. PCB 110b includes electrical traces 120 electrically coupling electrical connector 140 to optical transceiver 116. Electrical connector 140 may receive electrical connector 138 (illustrated as disconnected in FIG. 2) to electrically couple electrical cable 126 to optical transceiver 116. Removable module 100b operates similarly to removable module 100a.

Figure 3:
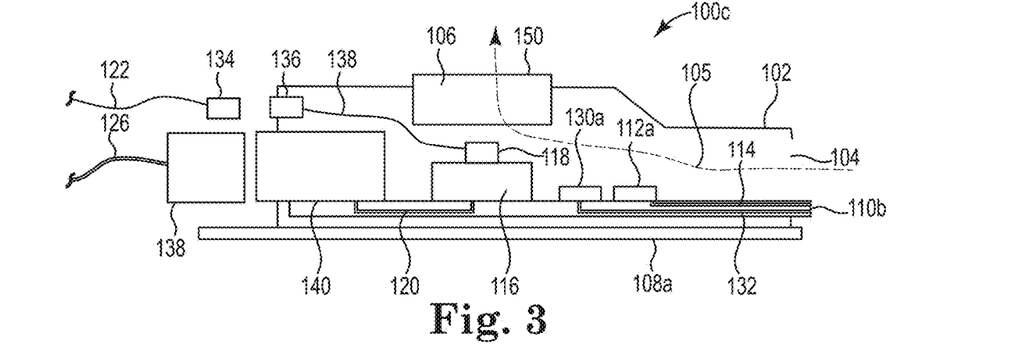
FIG. 3 illustrates another example of a removable module.

FIG. 3 illustrates another example of a removable module 100c. Removable module 100c is similar to removable module 100b previously described and illustrated with reference to FIG. 2, except that removable module 100c includes a fan 150. Fan 150 is mechanically coupled to housing 102 in air exhaust vent 106. Fan 150 may be electrically coupled to PCB 110b via electrical wires (not shown). Fan 150 moves air from air intake port 104 to air exhaust vent 106 as indicated by air flow path 105. Removable module 100c operates similarly to removable modules 100a and 100b.

Figure 4:
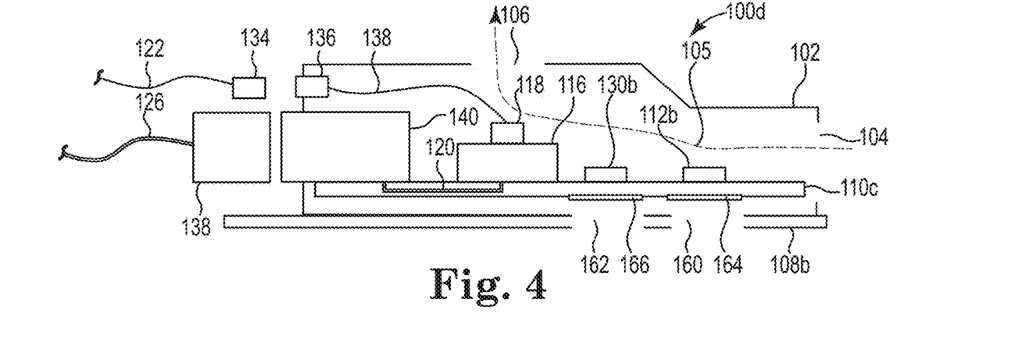
FIG. 4 illustrates another example of a removable module.

FIG. 4 illustrates another example of a removable module 100d. Removable module 100d is similar to removable module 100b previously described and illustrated with reference to FIG. 2, except that removable module 100d includes an alignment mechanism 108b, a PCB 110c, a power conditioner 112b, a management controller 130b, a wireless power interface 164, and a wireless management interface 166.

Alignment mechanism 108b may be received by a bay of a system to align removable module 100d in a system. Alignment mechanism 108b may include an opening 160 to enable a wireless interface between removable module 100d and a system for wirelessly receiving power from a system when removable module 100d is installed in a system. Alignment mechanism 108b may also include an opening 162 to enable a wireless interface between removable module 100d and a system for wirelessly communicating management signals between removable module 100d and a system when removable module 100d is installed in a system.

Power conditioner 112b is electrically coupled to the upper side of PCB 110c. Wireless power interface 164 is electrically coupled to the lower side of PCB 110c opposite to power conditioner 112b. Wireless power interface 164 may be an induction coil or a magnetic field coil to provide an inductive interface or a magnetic field interface, respectively, for power conditioner 112b. Power conditioner 112b wirelessly receives power from a system and converts and/or conditions the power to provide power for operating optical transceiver 116 when removable module 100d is installed in a system. In one example, power conditioner 112b may include a power storage device (e.g., a battery).

Management controller 130b is electrically coupled the upper side of PCB 110c. Wireless management interface 166 is electrically coupled to the lower side of PCB 110c opposite to management controller 130b. Wireless management interface 166 may be a Radio Frequency IDentification (RFID) antenna or a Near Field Communication (NFC) antenna to provide a RFID interface or a NFC interface, respectively, for management controller 130b. Management controller 130b may be used to configure, control, and/or monitor optical transceiver 116 and to wirelessly communicate management signals (e.g., configuration information, status information) between removable module 100d and a system when removable module 100d is installed in a system. Removable module 100d operates similarly to removable modules 100a and 100b.

Figure 5:
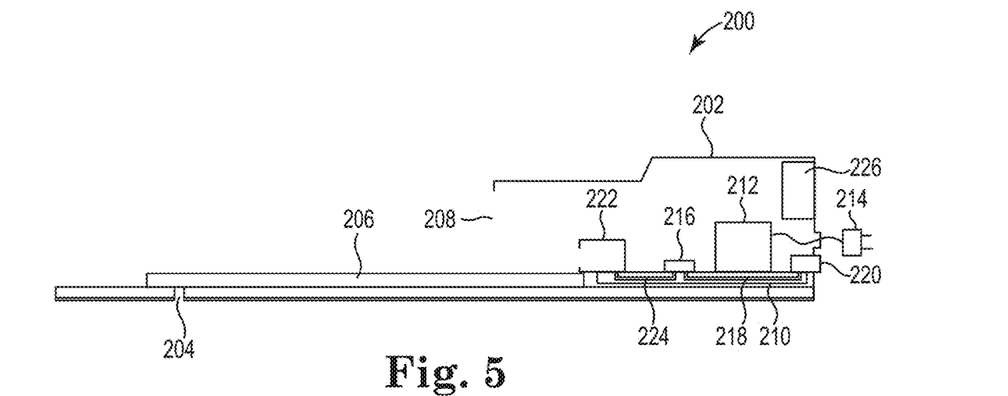
FIG. 5 illustrates one example of a bay for receiving a removable module.

FIG. 5 illustrates one example of a bay 200 for receiving a removable module. Bay 200 may be a power and management network distribution adapter for supplying power and cooling air to a removable module and for communicating management signals between the bay and a removable module when a removable module is installed in the bay. Bay 200 includes a housing 202, an alignment mechanism 206, a PCB 210, a power converter 212, a management controller 216, a network connector 220, an electrical connector 222, and a fan 226.

Housing 202 includes an opening 208 for receiving a removable module and for supplying air to a removable module when a removable module is installed in bay 200. Fan 226 may be mechanically coupled to housing 202. Fan 226 may supply cool air to a removable module through opening 208 when a removable module is installed in bay 200. Housing 202 may include a removable module retention mechanism 204, such as an opening for receiving a fastener or clip, for retaining a removable module within bay 200. Alignment mechanism 206 may engage with a corresponding alignment mechanism of a removable module to align a removable module within bay 200.

Power convertor 212 is electrically coupled to PCB 210. Power convertor 212 may include a power cord 214 for receiving power from a system in which bay 200 is installed. Power convertor 212 supplies power to management controller 216 and electrical connector 222 through electrical traces (not shown) of PCB 210. Power convertor 212 may also supply power to fan 226. In one example, fan 226 may be electrically coupled directly to PCB 210 (not shown). In another example, fan 226 may be electrically coupled indirectly to PCB 210 via electrical wires (also not shown).

Management controller 216, network connector 220, and electrical connector 222 are electrically coupled to PCB 210. Management controller 216 is electrically coupled to network connector 220 through electrical traces 218 of PCB 210. Network connector 220 may receive a network cable of a system to communicate management signals between bay 200 and the system. Management controller 216 is electrically coupled to electrical connector 222 through electrical traces 224 of PCB 210. Electrical connector 222 may engage with a removable module to supply power to the removable module from power convertor 212 and to communicate management signals between the removable module and management controller 216 when a removable module is installed in bay 200.

Figure 6:
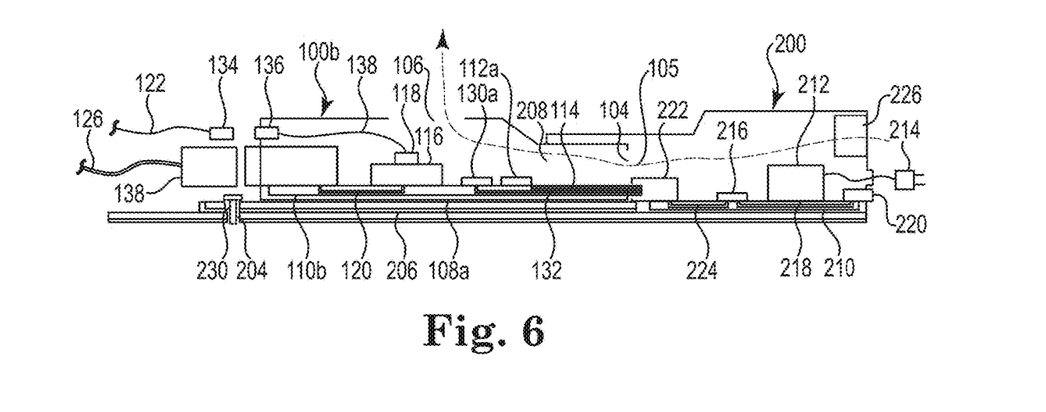
FIG. 6 illustrates one example of a bay with a removable module installed.

FIG. 6 illustrates one example of a bay 200 with a removable module 100b (previously described and illustrated with reference to FIG. 2) installed. With removable module 100b installed in bay 200, alignment mechanism 108a of removable module 100b is engaged with alignment mechanism 206 of bay 200. A retention mechanism 230, such as a fastener or clip, of removable module 100b may be engaged with retention mechanism 204 of bay 200 to mechanically couple removable module 100b to bay 200. Fan 226 may provide cool air to removable module 100b through air intake port 104 of removable module 100b as indicated by air flow path 105.

In this example, electrical connector 222 of bay 200 receives an edge of PCB 110b of removable module 100b to electrically couple removable module 100b to bay 200. In other examples, removable module 100b may be electrically coupled to bay 200 in another suitable manner. The electrical connection between removable module 100b and bay 200 supplies power from bay 200 to removable module 100b and enables the exchange of management signals between removable module 100b and bay 200. In other examples, in place of electrical connector 222, bay 200 may include a wireless power interface (not shown), such as an inductive interface or a magnetic field interface to wirelessly provide power to a removable module, such as removable module 100d previously described and illustrated with reference to FIG. 4. In addition, bay 200 may include an RFID interface or a NFC interface (not shown) to wirelessly exchange management signals with a removable module, such as removable module 100d.

Figure 7A:
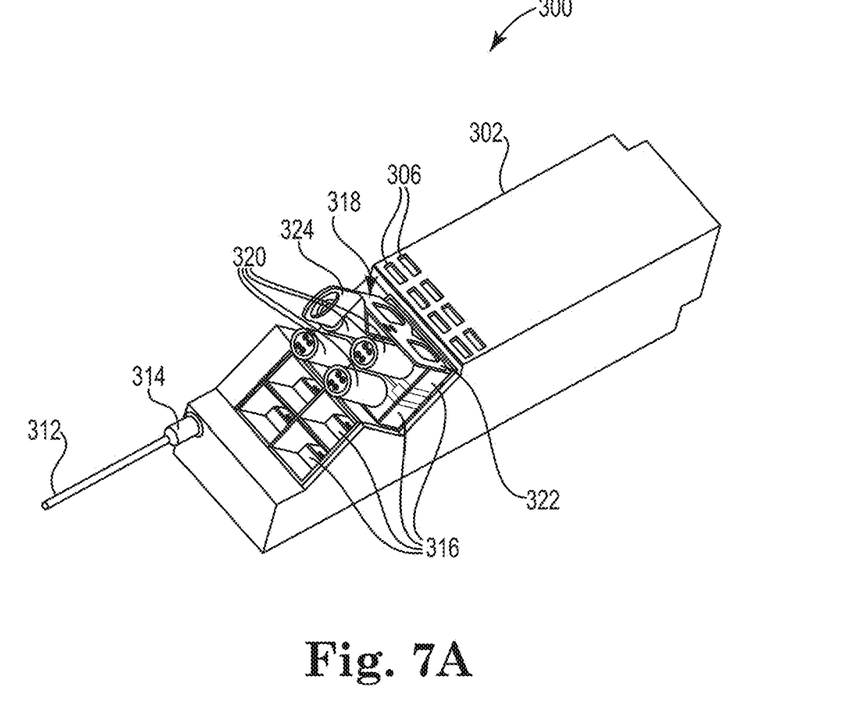
FIGS. 7A and 7B illustrate a top isometric view and a bottom isometric view, respectively, of one example of a removable module.
Figure 7B:
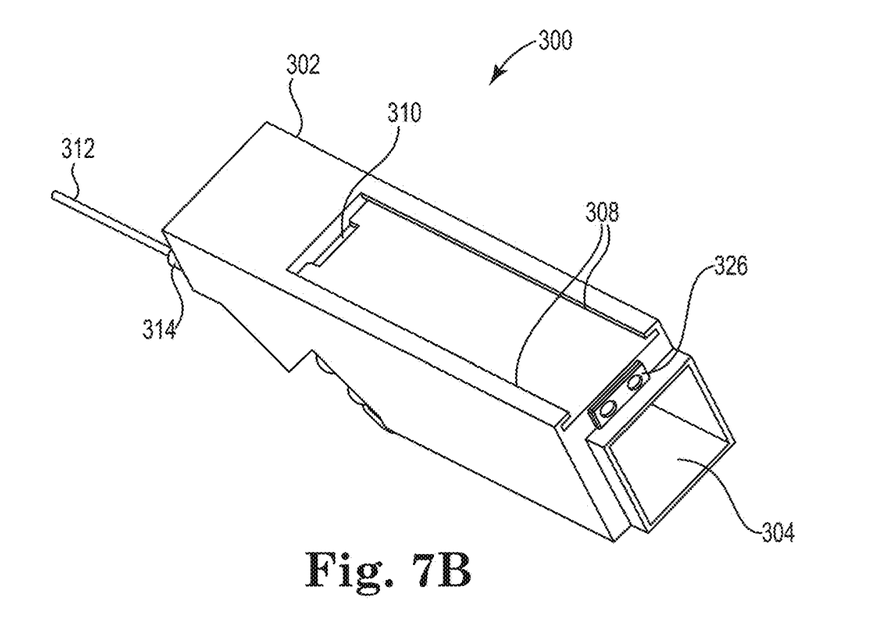

FIGS. 7A and 7B illustrate a top isometric view and a bottom isometric view, respectively, of one example of a removable module 300. Removable module 300 includes a housing 302 enclosing a PCB, a power conditioner, and an optical transceiver (not shown). Removable module 300 also includes an optical cable 312, an optical cable strain reliever 314, electrical receptacles 316, an electrical cable assembly 318, and an electrical connector 326. Electrical connector 326 may be used to provide power and management signals to removable module 300 from a bay of a system when removable module 300 is installed in a system. Electrical cable assembly 318 may include a plurality of electrical cables 320 terminated to an electrical connector 322. Electrical cable assembly 318 may also include a tab 324 for installing electrical cable assembly 318 into electrical receptacles 316 and for removing electrical cable assembly 318 from electrical receptacles 316.

Housing 302 includes an air intake port 304, air exhaust vents 306, an alignment mechanism 308, and a retention mechanism 310. In one example, air intake port 304 is arranged in a side wall of housing 302, and air exhaust vents 306 are arranged in the top wall of housing 302. Housing 302 is received by a bay of a system when removable module 300 is installed in a system. Alignment mechanism 308 may be engaged with a corresponding alignment mechanism of a bay to align removable module 300 in a system. Once installed in a system, the system supplies cool air to air intake port 304 for cooling removable module 300, and heated air is exhausted through air exhaust vents 306. Retention mechanism 310 may lock removable module 300 in place in a bay of a system when removable module 300 is installed in a system.

In the example illustrated in FIG. 7A, electrical cable assembly 318 includes four electrical cables to electrically couple to four electrical receptacles 316. In other examples, electrical cable assemblies including a different number of electrical cables for electrically coupling to a corresponding number of electrical receptacles 316 may be used. For example, removable module 300 including eight electrical receptacles 316 may support eight single cable assemblies, four two-cable assemblies, two four-cable assemblies, or suitable combinations thereof. While removable module 300 includes eight electrical receptacles 316, in other examples removable module 300 may include another suitable number of electrical receptacles, such as 4, 12, 16, 24, or 32. Each electrical cable 320 may include multiple pairs of electrical signal wires. One pair of electrical signal wires of each electrical cable 320 is for transmitting signals from removable module 300 to a computing device (e.g., a server), and another pair of electrical signal wires of each electrical cable 320 is for receiving signals from the computing device.

Optical cable 312 includes a plurality of optical fibers for transmitting/receiving a plurality of optical signals. In one example, optical cable 312 is an optical trunk cable to optically couple removable module 300 to an electrical device (e.g., a switch module). In this example, optical cable 312 is fixedly attached to removable module 300 and extends from inside housing 302 to outside housing 302. Optical cable 312 extends through optical cable strain reliever 314 to prevent strain on the optical connection between optical cable 312 and the optical transceiver within housing 302. In other examples, optical cable 312 may be terminated to an optical connector, which may be received by a corresponding optical connector of removable module 300.

In operation, an optical transceiver within housing 302 receives optical signals through optical cable 312 from an electrical device (e.g., a switch module) and converts the optical signals to electrical signals. The electrical signals are then distributed to a plurality of computing devices (e.g., servers) through electrical cables 320. The optical transceiver also receives electrical signals from the plurality of computing devices through electrical cables 320 and converts the electrical signals to optical signals. The optical signals are then transmitted through optical cable 312 to the electrical device.

Figure 8:
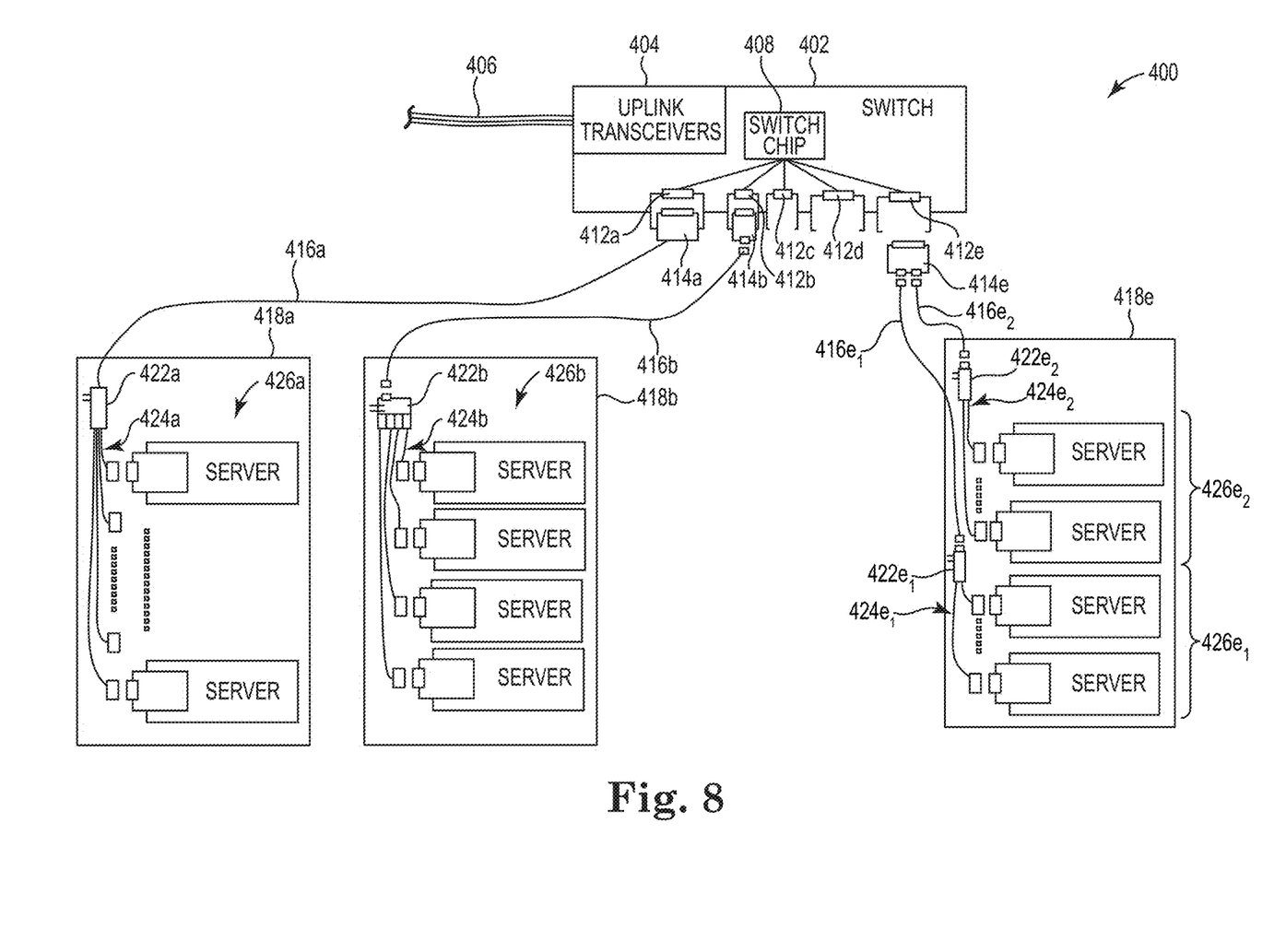
FIG. 8 illustrates one example of a system including removable modules.

FIG. 8 illustrates one example of a system 400 including removable modules 422a, 422b, 422$e_1$, and 422$e_2$. Bays to accept the removable modules in system 400 are not shown. System 400 includes a switch 402 and racks 418a, 418b, and 418e. Switch 402 may include uplink transceivers 404 to communicatively couple switch 402 to other electrical devices (e.g., upper level switches) through communication cables 406 (e.g., optical or electrical cables). Uplink transceivers 404 may include multiple uplink transceiver receptacles and corresponding multiple removable uplink transceiver modules (not shown). Switch 402 includes a switch chip 408, such as an Application Specific Integrated Circuit (ASIC) electrically coupled to uplink transceivers 404 and to optical transceiver receptacles 412a, 412b, 412c, 412d, and 412e. In other examples, one or more of optical transceiver receptacles 412a, 412b, 412c, 412d, and 412e may be replaced with one or more optical transceivers integrated into switch 402.

Optical transceiver receptacle 412a may be communicatively coupled to removable module 422a through a near-end optical transceiver 414a (illustrated disconnected) and an optical cable 416a. Removable module 422a disposed in rack 418a may be communicatively coupled to 24 servers 426a disposed in rack 418a through electrical cables 424a (illustrated disconnected from servers 426a). In this example, optical cable 416a and electrical cables 424a are fixedly attached to removable module 422a. Removable module 422a receives power from rack 418a. Removable module 422a includes an optical transceiver for converting optical signals received from switch 402 through optical cable 416a into electrical signals to distribute to servers 426a through electrical cables 424a. The optical transceiver also converts electrical signals received from servers 426a through electrical cables 424a into optical signals to transmit to switch 402 through optical cable 416a.

Optical transceiver receptacle 412b may be communicatively coupled to removable module 422b through a near-end optical transceiver 414b (illustrated disconnected) and an optical cable 416b (illustrated disconnected). Removable module 422b disposed in rack 418b may be communicatively coupled to four servers 426b disposed in rack 418b through electrical cables 424b (illustrated disconnected from servers 426b). In this example, removable module 422b includes an optical connector for optically coupling to optical cable 416b and electrical connectors for electrically coupling to electrical cables 424b. Removable module 422b receives power from rack 418b. Removable module 422b includes an optical transceiver for converting optical signals received from switch 402 through optical cable 416b into electrical signals to distribute to servers 426b through electrical cables 424b. The optical transceiver also converts electrical signals received from servers 426b through electrical cables 424b into optical signals to transmit to switch 402 through optical cable 416b.

Optical transceiver receptacle 412e may be communicatively coupled to removable module $422e_1$ through a near-end optical transceiver 414e (illustrated disconnected) and an optical cable $416e_1$ (illustrated disconnected) and communicatively coupled to removable module $422e_2$ through optical transceiver 414e and optical cable $416e_2$ (illustrated disconnected). Removable module $422e_1$ disposed in rack 418e may be communicatively coupled to 12 servers $426e_1$ disposed in rack 418e through electrical cables $424e_1$ (illustrated disconnected from servers $426e_1$). In this example, removable module $422e_1$ includes an optical connector for optically coupling to optical cable $416e_1$ and is fixedly attached to electrical cables $424e_1$. Removable module $422e_1$ receives power from rack 418e. Removable module $422e_1$ includes an optical transceiver for converting optical signals received from switch 402 through optical cable $416e_1$ into electrical signals to distribute to servers $426e_1$ through electrical cables $424e_1$. The optical transceiver also converts electrical signals received from servers $426e_1$ through electrical cables $424e_1$ into optical signals to transmit to switch 402 through optical cable $416e_1$.

Removable module $422e_2$ disposed in rack 418e may be communicatively coupled to 12 servers $426e_2$ disposed in rack 418e through electrical cables $424e_2$ (illustrated disconnected from servers $426e_2$). In this example, removable module $422e_2$ includes an optical connector for optically coupling to optical cable $416e_2$ and is fixedly attached to electrical cables $424e_2$. Removable module $422e_2$ receives power from rack 418e. Removable module $422e_2$ includes an optical transceiver for converting optical signals received from switch 402 through optical cable $416e_2$ into electrical signals to distribute to servers $426e_2$ through electrical cables $424e_2$. The optical transceiver also converts electrical signals received from servers $426e_2$ through electrical cables $424e_2$ into optical signals to transmit to switch 402 through optical cable $416e_2$.

Examples of the removable optical transceiver module disclosed herein may provide a smaller failure domain by supporting fewer servers per removable module. A failure of the removable module affects only the servers connected to the removable module. In addition, servicing and/or upgrading the removable module may affect the availability of fewer servers. The removable modules may also be sized to minimize stranded ports of switch modules. Cooling of the removable modules may be supported by the bay of a system in which a removable module is installed. The bay of a system may provide forced air cooling or an alternate method of cooling, such as liquid cooling, to an installed removable module. Optical and/or electrical cables of different types may be supported to different servers within the same rack. Each removable module may be placed physically closer to the servers the removable module supports for improved cable management, smaller-size and lower-cost cables, and high-speed data rates (e.g., 25 Gbps and higher). A removable module may occupy one or multiple bays of a system, enabling varying power and/or cooling capabilities for the removable module. In addition, the removable modules may include low-cost power convertors and/or regulators.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A removable module comprising:
   an optical transceiver to convert optical signals received through an optical cable to electrical signals to distribute to a plurality of computing devices through electrical cables and to convert electrical signals received from the plurality of computing devices through the electrical cables to optical signals to transmit through the optical cable;
   a power conditioner to receive power from a system with the removable module installed in the system, the power conditioner to provide power to the optical transceiver;
   a housing enclosing the optical transceiver and the power conditioner, the housing comprising an air intake port and an air exhaust vent,
   wherein the housing is to be received by a bay of the system with the removable module installed in the system, the bay to provide an interface to the power conditioner of the removable module and to provide air to the air intake port of the removable module;
   an optical cable receptacle to optically couple the removable module to the optical cable; and
   an optical jumper optically coupling the optical cable receptacle to the optical transceiver.

2. The removable module of claim 1, further comprising:
   a controller to communicate management signals between the removable module and the system with the removable module installed in the system, wherein the bay of the system provides an interface to the controller of the removable module with the removable module installed in the system.

3. The removable module of claim 2, wherein the controller comprises a wireless interface to wirelessly communicate management signals between the removable module and the system with the removable module installed in the system.

4. The removable module of claim 1, wherein the power conditioner comprises a wireless interface to wirelessly receive power from the system with the removable module installed in the system.

5. The removable module of claim 1, further comprising:
an electrical cable receptacle electrically coupled to the optical transceiver, the electrical cable receptacle to electrically couple the removable module to the plurality of computing devices.

6. The removable module of claim 1, further comprising:
a fan to move air from the air intake port to the air exhaust vent.

7. The removable module of claim 1, further comprising:
a printed circuit board electrically coupling the optical transceiver to the power conditioner, the printed circuit board to electrically couple the power conditioner to the system with the removable module installed in the system.

8. The removable module of claim 1, further comprising:
a retention mechanism to mechanically couple the removable module to the bay with the removable module installed in the system; and
an alignment mechanism to align the removable module in the bay with the removable module installed in the system.

9. A removable module comprising:
a housing;
a printed circuit board;
an optical cable to couple to a switch module, the optical cable fixedly attached to the removable module and extending from inside the housing to outside the housing;
an electrical cable to couple to a plurality of computing devices, the electrical cable fixedly attached to the printed circuit board and extending from inside the housing to outside the housing;
an optical transceiver coupled to the printed circuit board, the optical transceiver to convert optical signals received through the optical cable to electrical signals to transmit through the electrical cable and to convert electrical signals received through the electrical cable to optical signals to transmit through the optical cable; and a power conditioner coupled to the printed circuit board, the power conditioner to receive power from a system with the removable module installed in the system, the power conditioner to provide power to the optical transceiver.

10. The removable module of claim 9, further comprising:
a controller coupled to the printed circuit board, the controller to communicate management signals between the removable module and the system with the removable module installed in the system,
wherein the housing comprises an air intake port and an air exhaust vent, and
wherein the housing is to be received by a bay of the system with the removable module installed in the system such that the bay provides an interface to the power conditioner of the removable module, provides an interface to the controller of the removable module, and provides air to the air intake port of the removable module.

11. A removable module comprising:
an optical transceiver to convert optical signals received through an optical cable to electrical signals to distribute to a plurality of computing devices through electrical cables and to convert electrical signals received from the plurality of computing devices through the electrical cables to optical signals to transmit through the optical cable;
a power conditioner to wirelessly receive, via a wireless power interface, power from a system with the removable module installed in the system, the power conditioner to provide power to the optical transceiver; and
a printed circuit board electrically coupling the optical transceiver to the power conditioner, the printed circuit board to couple the power conditioner to the system, via the wireless power interface, with the removable module installed in the system.

12. The removable module of claim 11, wherein the power conditioner comprises an inductive interface or a magnetic field interface.

13. The removable module of claim 11, further comprising:
a controller to wirelessly communicate management signals between the removable module and the system with the removable module installed in the system.

14. The removable module of claim 13, wherein the controller comprises a Radio Frequency IDentification (RFID) interface or a Near Field Communication (NFC) interface.

15. The removable module of claim 1, wherein the power conditioner includes a power storage device.

* * * * *